United States Patent
Wei et al.

(10) Patent No.: US 7,262,876 B2
(45) Date of Patent: Aug. 28, 2007

(54) PLUGGABLE RIP SYSTEM

(75) Inventors: Hongfeng Wei, Garden Grove, CA (US); Man M. Garg, Cerritos, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 921 days.

(21) Appl. No.: 10/609,321

(22) Filed: Jun. 27, 2003

(65) Prior Publication Data

US 2004/0263902 A1    Dec. 30, 2004

(51) Int. Cl.
G06F 3/12 (2006.01)
G06K 1/00 (2006.01)

(52) U.S. Cl. ..................... 358/1.15; 358/1.13

(58) Field of Classification Search .............. 358/1.15, 358/1.13, 1.14, 1.16, 1.17, 1.18, 1.11, 1.1, 358/1.2, 1.6, 407, 468; 345/502, 467, 551, 345/505, 506
See application file for complete search history.

(56) References Cited

U.S. PATENT DOCUMENTS

| | | | | |
|---|---|---|---|---|
| 5,075,874 A | * | 12/1991 | Steeves et al. | 358/1.13 |
| 5,828,814 A | * | 10/1998 | Cyman et al. | 358/1.2 |
| 5,949,438 A | | 9/1999 | Cyman et al. | |
| 6,606,165 B1 | * | 8/2003 | Barry et al. | 358/1.9 |
| 6,825,943 B1 | * | 11/2004 | Barry et al. | 358/1.15 |
| 6,929,411 B2 | * | 8/2005 | Christiansen et al. | 400/70 |
| 2002/0060801 A1 | | 5/2002 | Motamed et al. | |
| 2002/0181461 A1 | | 12/2002 | Lumley | |
| 2004/0196493 A1 | * | 10/2004 | Christiansen et al. | 358/1.15 |
| 2005/0094194 A1 | * | 5/2005 | Dolev et al. | 358/1.15 |

OTHER PUBLICATIONS

Fushion SP Raster Image Processor By: Fusion System International, Updated Dec. 9, 2002.

* cited by examiner

*Primary Examiner*—Dov Popovici
(74) *Attorney, Agent, or Firm*—Tucker Ellis & West LLP

(57) ABSTRACT

A pluggable Raster Imaging Processor (RIP) system with two layers. The first layer is the RIP manager layer, which is mainly responsible for load balancing when multiple jobs requiring different types of raster conversion are encountered. The top layer is also responsible for communicating with other modules such as the Job Manager to start the job at the right trigger and obtain the type of rasterization required, and the Print Data Manager to forward the job to the physical image output device. The second layer includes a series of pluggable Raster Image Processors which perform the actual rasterizing of the images. Different Raster Image Processors can be plugged into the controller by registering themselves to the RIP manager layer. When registering, the Raster Image Processor denotes what types of images it can rasterize, such as FAX, PDL, or other formats.

20 Claims, 2 Drawing Sheets

PLUGGABLE RIP SYSTEM

BACKGROUND OF THE INVENTION

The present invention relates generally to multi-function peripherals and more particularly to image output systems using Raster Image Processors (RIP).

Multi-function peripherals are able to handle different jobs simultaneously such as fax jobs, print jobs, copy jobs, POPclient print jobs, TopAccess Composer (TAC) print jobs, etc. Because of the wide variety of job types, there are several considerations such as how the controller is going to manage the Central Processing Unit (CPU) power for those jobs, how to control the status of jobs, for example pause, resume, cancel, etc., how to expand the job types handled by the multifunction peripheral in the future, and how to manage different types of raster conversions at the same time and perform load balancing.

BRIEF SUMMARY OF THE INVENTION

In view of the aforementioned needs, the present invention contemplates a pluggable Raster Imaging Processor (RIP) system with two layers.

The first layer, the top layer, is the RIP manager layer, which is mainly responsible for load balancing when multiple jobs requiring different types of raster conversion are encountered. The top layer is also responsible for communicating with other modules such as the Job Manager to start the job at the right trigger and obtain the type of rasterization required, and the Print Data Manager to forward the job to the physical image output device.

The second layer comprises a series of pluggable Raster Image Processors which perform the actual rasterizing of the images. Different Raster Image Processors can be plugged into the controller by registering themselves to the RIP manager layer. The type of Raster Image Processor determines what type of job it handles. For example a Fax Raster Image Processor processes fax jobs, a POPClient Raster Image Processor handles POPClient email jobs, a TAC Raster Image Processor handles TAC jobs, an Adobe Raster Image Processor can be used to finish complex PostScript jobs and a Color Raster Image Processors can be used to handle color print jobs, etc. The pluggable Raster Image Processors may be developed by third parties as long the Raster Image Processor follows the protocol that is defined between the second layer, the Raster Image Processor, and the first layer, the RIP Manager. With the present invention, a Raster Image Processing system is expandable to a variety of job types. The present invention allows for future expansion of new job types, by simply creating a Raster Image Processor, or purchasing the Raster Image Processor from a third party, and registering the Raster Image Processor with the RIP Manager layer.

As those skilled in the art can readily appreciate, the present invention may be implemented in software, hardware, or a combination thereof.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Figure 1:
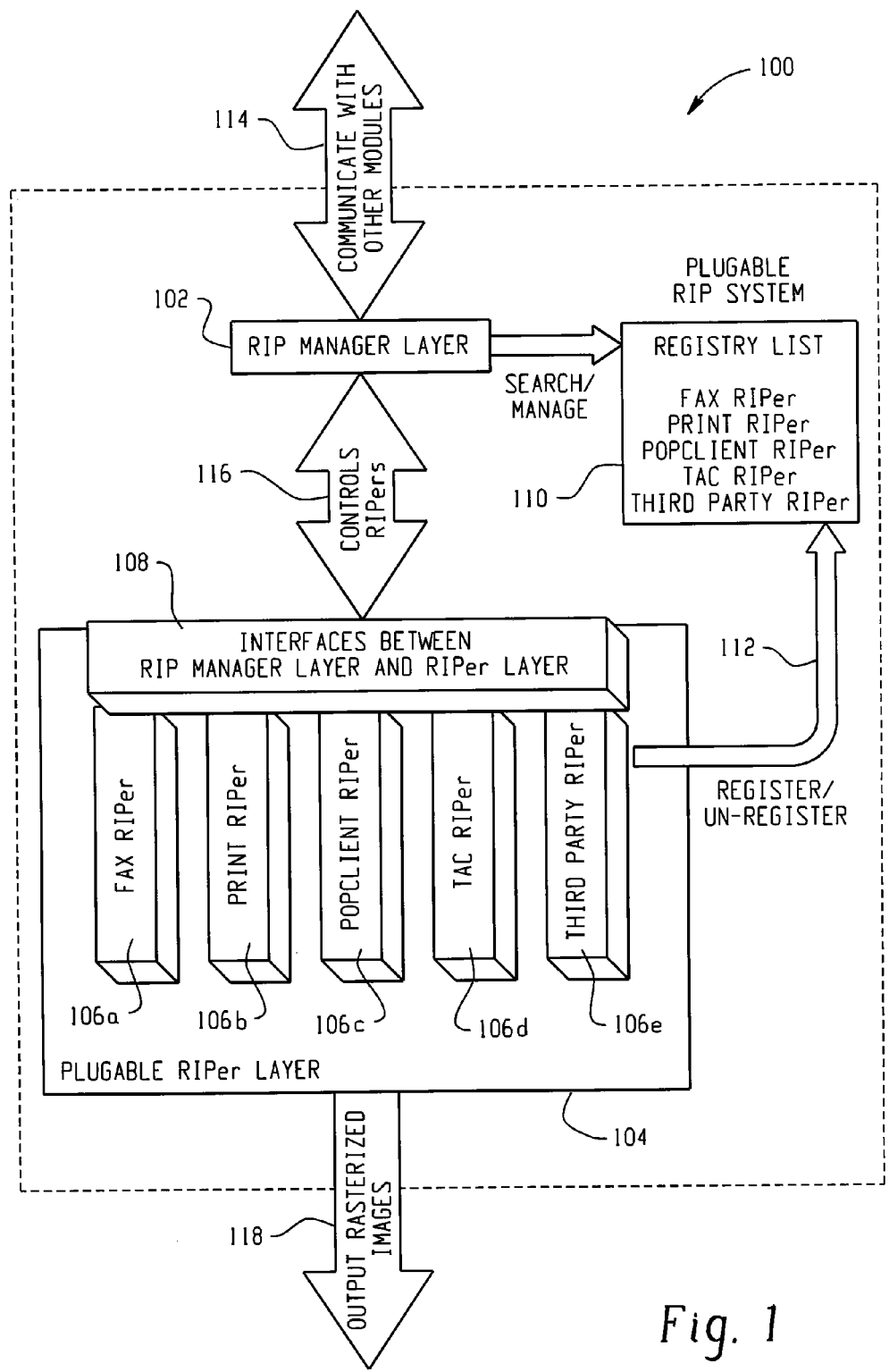
FIG. 1 is a block diagram illustrating an overview of a pluggable Raster Image Processor System contemplated by the preferred embodiment of the present invention.

Throughout this description, the preferred embodiment and examples shown should be considered as exemplars, rather than limitations, of the present invention.

The present invention contemplates a pluggable Raster Imaging Processor (RIP) system with two layers. The first layer is a Raster Imaging Processor (RIP) Manager Layer, and the second layer is a pluggable Raster Imaging Processor layer.

The Raster Imaging Processor Manager layer has two sets of interfaces, one of which will be used to communicate with other modules of the printing system, for example communicating with the Job Manager to get a job pause, a job resume, or a job cancel message. The other interface will be used to control the Raster Imaging Processors (the second layer). The Raster Imaging Processor Manager also manages a registry list that contains information about registered Raster Imaging Processors, such as which Raster Imaging Processor corresponds to which job type, for example the FAX Raster Imaging Processor handles fax jobs, etc.

When new jobs arrive in the printing system, the upper layers of the system usually provide enough information in the job metadata to determine the type of rasterization required. Once, the Raster Imaging Processor Manager receives a job, the Raster Imaging Processor determines the type of rasterization required, usually on the basis of job metadata. The Raster Imaging Processor Manager then searches its registry list to find the entry point for the appropriate Raster Imaging Processor and sends the job to the Raster Imaging Processor with the required parameters, such as Job ID, queue name, etc. the underlying Raster Imaging Processor will then process the job and provide feedback to the Raster Imaging Processor Manager (the first layer) as the rasterization process progresses. The Raster Imaging Processor Manager will notify the printing system of the progress of Raster Imaging Processing so that synchronous printing can proceed as the job is being rasterized. The Raster Imaging Processor Manager also monitors the Raster Imaging Processor to ensure that the job is being correctly processed. If any errors occur, the Raster Imaging Processor Manager is responsible for taking corrective action such as re-launching the Raster Imaging Processor to finish the job. The Raster Imaging Processor Manager may be set to re-launch the job and if after a certain number of times the job has not been successfully processed then mark the job as unserviceable. The Raster Imaging Processor will exit when the job is processed and the Raster Imaging Processor Manager will notify other modules that the Raster Imaging Processor has completed the job.

The second layer is the pluggable Raster Imaging Processor layer (pluggable RIP layer). The pluggable RIP layer comprises different kinds of Raster Imaging Processors developed to conform with the protocol between the RIP Manager and the pluggable RIP layer. The Raster Imaging Processors receive messages from the RIP Manager to start a job, pause a job, resume a job, or to cancel a job. Different Raster Imaging Processors will be launched by the RIP Manager corresponding to the job type. The Raster Imaging Processors may be pluggable or unpluggable (hardwired or hard coded). A new Raster Imaging Processor registers itself to the RIP Manger's Registry in order to notify the RIP Manager that it is available and what type of jobs it can handle. An existing Raster Imaging Processor can un-register itself from the Registry to avoid being called again, or called when it is unavailable. The pluggable feature of the present invention makes the rasteriztion core very flexible, expandable and easy to maintain A protocol is established between the RIP Manager and the pluggable RIP layer. The example given below infra shows a protocol developed in XML code, however, as those skilled in the art can readily appreciate any suitable protocol may be adapted. Furthermore, instead of a protocol, a database or other searchable file format may also be used. A sample XML reads as follows:

```
<?xml version="1.0" encoding="UTF-8" ?>
- <key name="RIPPER">
    <value name="ripper_registration" type="uint32">4</value>
- <key name="1">
    <value name="ripper_name" type="string">taripper</value>
    <value name="comments" type="string">PCL RIPer</value>
    <value name="parameter_taken" type="uint32">1</value>
    <value name="enabled" type="uint32">1 - Yes</value>
    <value name="job_type" type="uint32">3 - PCL6 Job</value>
    <value name="job_type_extra" type="uint32">4 -
        PCL5e Job</value>
    <value name="parameter_1" type="string">JobID, uint32</value>
  </key>
- <key name="2">
    <value name="ripper_name" type="string">tafaxripper</value>
    <value name="comments" type="string">FAX RIPer</value>
    <value name="parameter_taken" type="uint32">2</value>
    <value name="enabled" type="uint32">1 - Yes</value>
    <value name="job_type" type="uint32">2 - Outbound
        FAX Job</value>
    <value name="job_type_extra" type="uint32">10 - Inbound FAX
        Job</value>
    <value name="parameter_1" type="string">JobID, uint32</value>
    <value name="parameter_2" type="string">QueueName,
        eTaQueue</value>
  </key>
- <key name="3">
    <value name="ripper_name" type="string">taemailripper</value>
    <value name="comments" type="string">POPClient RIPer</value>
    <value name="parameter_taken" type="uint32">1</value>
    <value name="enabled" type="uint32">1 - Yes</value>
    <value name="job_type" type="uint32">5 - Email Job</value>
    <value name="job_type_extra" type="uint32">0 - None</value>
    <value name="parameter_1" type="string">JobID, uint32</value>
  </key>
</key>
```

The above XML code would typically be interpreted as follows. The key name "RIPPER" has a value name "ripper_regisration" to indicate the number of Raster Image Proccessors (RIPers) are registered, which in this example is 4 as indicated by the 4 before the /value. The key name lines below that point indicate which Raster Image Processor is being described (either 1, 2, 3 or 4). Thus, "<key name="1"> statement above means that Raster Image Processor number 1 is being described. The lines between <key name=X> and <key name=X+> describe the features of Raster Image Processor "X." For example, the lines starting with <value name="ripper_name" then give the name of the executable file for the Raster Image Processor, which for number is "taripper." The lines beginning with <value name—"comments" allow a text string comments to be entered. The lines beginning with <value name="parameter_taken" indicates how many parameters the Raster Image Processor will take for processing the job. For example Raster Image Processor numbers 1 and take one parameter whereas Raster Image Processor number 2 takes two parameters. The lines beginning with <value name="enabled" . . . > indicate that the Raster Image Processor is available to process jobs. The lines starting with <value name="job type" . . . > describe the main type of job the Raster Image Processor can handle. For example, Raster Image Process 1 handles PCL6, Raster Image Processor 2 handles outbound faxes, and Raster Image Processor 3 handles email jobs. The lines beginning with <value name—"job_type_extra" indicate other types of jobs the raster image processor can handle. For example, Raster Image Processor 1 can also handle PCL5e jobs and Raster Image Processor Number 2 can also handle Inbound Fax jobs. Finally the lines beginning with <value name="parameter_ . . . " . . . >describe the parameters taken by the raster image processor, such as job identification, queue name, destination, etc.

Referring now to FIG. 1, there is shown an overview of a Pluggable RIP System 100 contemplated by the preferred embodiment of the present invention. The system 100 comprises two layers, the RIP Manager Layer 102 and the Pluggable RIP Layer 104. As shown in FIG. 1, the Pluggable RIP Layer 104 comprises a FAX Raster Imaging Processor 106a, a Print Raster Imaging Processor 106b, a POPClient Raster Imaging Processor 106c, a TAC Raster Imaging Processor 106d, and a Third Party Raster Imaging Processor 106e. An interface 108 is between the RIP Manager Layer 102 and the Raster Imaging Processors 106a-106e.

The registry 110 is a list of Raster Imaging Processors that are registered with the RIP Manager Layer 102. The registry 110 may be any kind of searchable file such as a text file, database file, XML file. Raster Imaging Processors 106a-106e from the Pluggable RIP Layer 104 send register and un-register messages to the registry 110 as indicated by arrow 112.

As shown by arrow 114, bi-directional communication with other modules occurs with the RIP Manager Layer 102. As shown by arrow 116, bi-directional communication occurs between the RIP Manager Layer 102 and the pluggable RIP layer 104. Finally, as shown by arrow 118, the rasterized image is output from the pluggable RIP layer 104.

Figure 2:
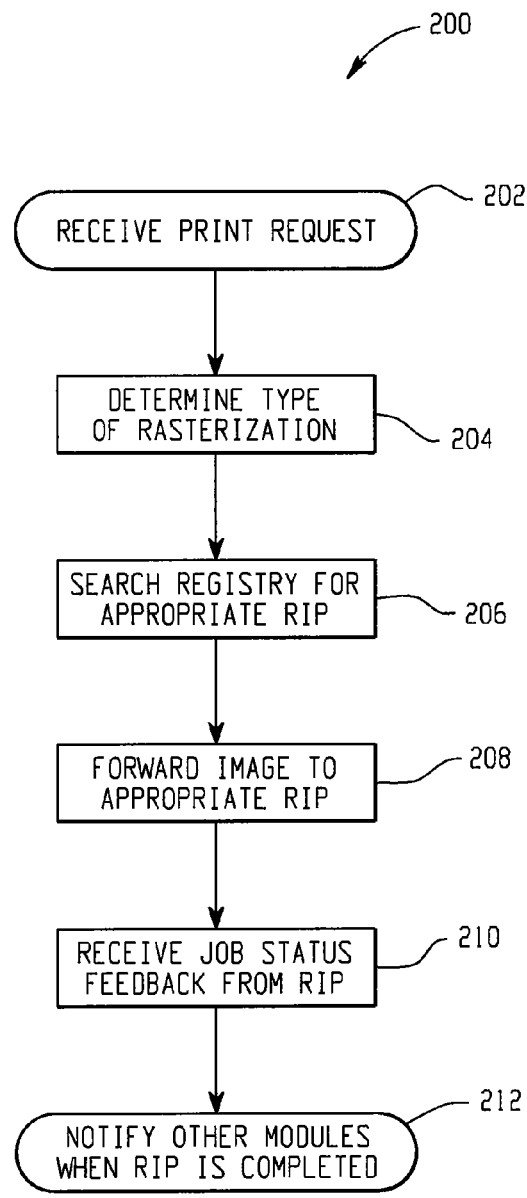
FIG. 2 is a block diagram illustrating the steps of a method contemplated by the present invention.

Referring now to FIG. 2, there is shown a method 200 contemplated by a preferred embodiment of the present invention. At step 202 the pluggable RIP system 100 receives a print request. While the request in step 202 is shown as a print request, the request may be any type of request that requires Raster Image Processing, such as print, fax, copy, or store a Raster Image Processed document. The RIP Manager Layer 102 then determines the type of rasterization required for the print request as shown in step 204. At step 206 the RIP Manager Layer 102 searches the Registry 110 for the appropriate Raster Imaging Processor to handle the job. At step 208 the job is then send from the RIP Manager Layer 102 to the Pluggable RIP Layer 104 wherein the job is forwarded to the appropriate Raster Imaging Processor 106a-106e. While the job is being processed, the Pluggable RIP Layer 104 provides job status feedback to the RIP Manager Layer 102 as shown in step 210. When the Pluggable RIP Layer 104 has completed processing the job, it notifies the RIP Manager Layer 102, the RIP Manager Layer 102 then notified other modules that the RIP is completed as shown in step 212.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A pluggable Raster Image Processor system, comprising:
    a Raster Image Processor Manager Layer;
    a pluggable Raster Image Processor Layer communicatively coupled to the Raster Image Processor Manager Layer, the pluggable Raster Image Processor Layer comprising a plurality of Raster Image Processors; and
    a registry communicatively coupled to the Raster Image Processor Manager Layer and the pluggable Raster Image Processor Layer;
    wherein when a job is received, the Raster Image Processor Manager Layer determines the job type and forwards the job to the pluggable Raster Image Processor Layer for processing.

2. The pluggable Raster Image Processor of claim 1 wherein the Raster Image Processor Manage Layer obtains a job type from metadata embedded within the job.

3. The pluggable Raster Image Processor of claim 2 wherein the Raster Image Processor Manager Layer determines the appropriate Raster Image Processor for the job type by searching the registry.

4. The pluggable Raster Image Processor of claim 1, the pluggable Raster Image Processor Layer further comprising an interface for receiving the job from the Raster Image Processor Manager Layer and routing the job to a select one of the plurality of Raster Image Processors.

5. The pluggable Raster Image Processor of claim 1 wherein when a new Raster Image Processor is added to the pluggable Raster Image Processor Layer, an entry is added to the registry.

6. The pluggable Raster Image Processor system of claim 5 wherein the entry comprises a point of entry for the Raster Image Processor and at least one job type that the Raster Image Processor is capable of processing.

7. The pluggable Raster Image Processor of claim 1, the pluggable Raster Image Processor Layer further comprising means adapted to notify the Raster Image Processor Manager Layer when a job is completed.

8. The pluggable Raster Image Processor of claim 1, the plurality of Raster Image Processors comprising at least two selected from the group consisting of a fax Raster Image Processor, a print Raster Image Processor, a Post Office Protocol Client, a terminal access control Raster Image Processor, and a POSTSCRIPT Raster Image Processor.

9. A method for processing in a Raster Image Processor, the steps comprising:
    receiving a raster imaging process job;
    determining a job type;
    selecting a Raster Imaging Processor from a plurality of Raster Image Processors;
    forwarding the job to the selected Raster Image Processor; and
    notifying other modules when the raster imaging process job is completed.

10. The method of claim 9 further comprising
    registering a Raster Image Processor with a registry, the registry storing the job type the Raster Image Processor is capable of processing.

11. The method of claim 10, the selecting step comprises searching the registry for a Raster Image Processor matching the job type.

12. The method of claim 9, the determining step comprising searching the raster imaging process job for metadata indicating the job type.

13. The method of claim 9 further comprising;
    tracking errors encountered by the Raster Image Processor when processing the raster imaging process job; and
    marking the job as unserviceable after a predetermined number of errors are encountered.

14. The method of claim 9 further comprising:
    de-registering a Raster Image Processor from the plurality of Raster Image Processors.

15. A computer readable medium encoded with instructions capable of being executed by a computer, the instructions stored being for a pluggable Raster Image Processor system, comprising:
    means adapted to register a raster imaging processor;
    means adapted to receive a raster imaging process job
    means adapted to determine a job type;
    means adapted to select the raster imaging processor from a plurality of registered raster image processors;
    means adapted to forward the job to the selected Raster Image Processor; and
    means adapted to notify other modules when the raster imaging process job is completed.

16. The computer readable medium of claim 15, the means adapted to register comprising a registry, the registry storing the job type that the raster image processor is capable of processing.

17. The computer readable medium of claim 16, the means adapted to select comprises means for searching the registry for a raster image processor matching the job type.

18. The computer readable medium of claim 15, the means adapted to determine a job type, comprising means adapted to searching the raster imaging process job for metadata indicating the job type.

19. The computer readable medium of claim 15 further comprising;
    means adapted to tracking errors encountered by the Raster Image Processor when processing the raster imaging process job; and
    means adapted to marking the job as unserviceable after a predetermined number of errors are encountered.

20. The computer readable medium of claim 15 further comprising:
    means adapted to de-registering a raster image processor from the plurality of raster image processors.

* * * * *